UNITED STATES PATENT OFFICE.

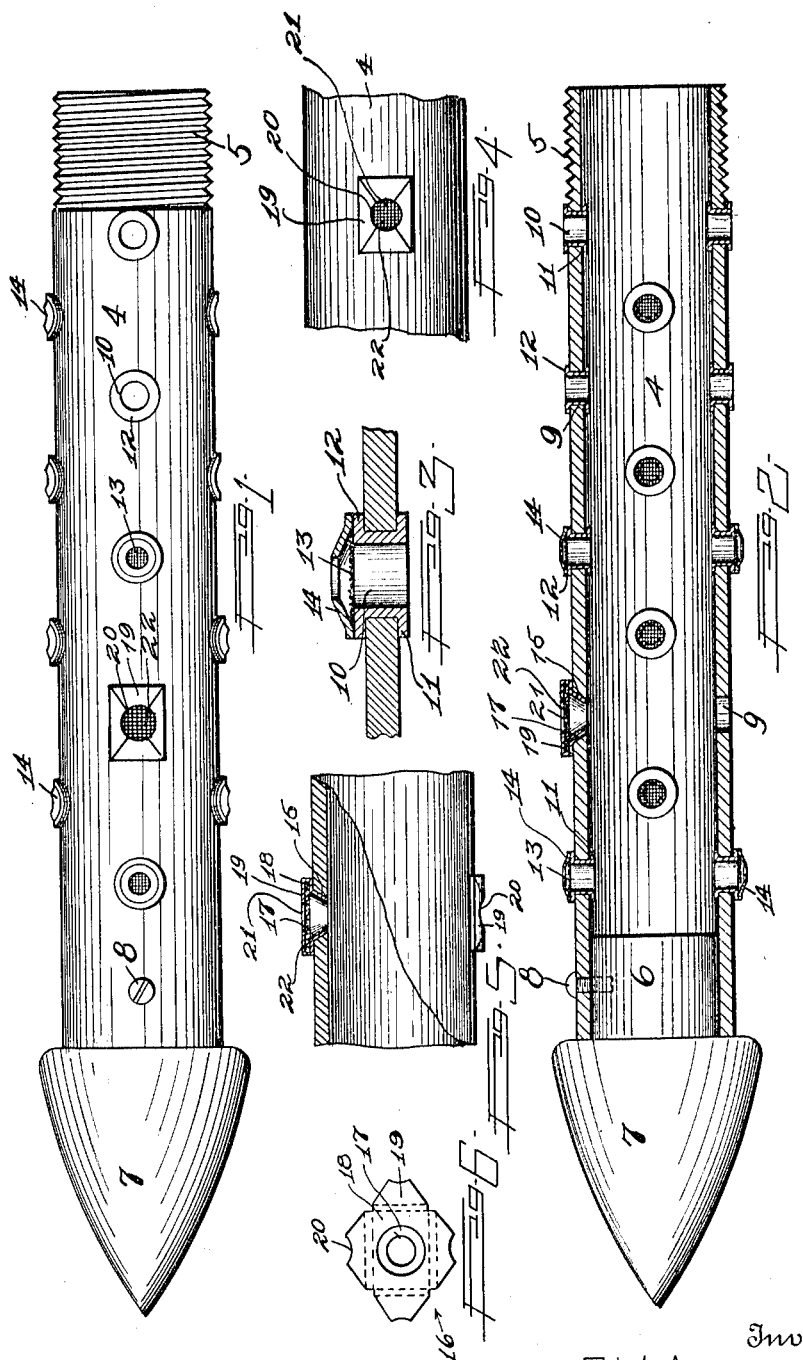

OLAVE W. ANDREWS, OF CHARLESTON, MISSOURI.

DRIVE WELL-POINT.

1,073,835.  Specification of Letters Patent.  Patented Sept. 23, 1913.

Application filed February 6, 1913.  Serial No. 746,564.

*To all whom it may concern:*

Be it known that I, OLAVE W. ANDREWS, a citizen of the United States, residing at Charleston, in the county of Mississippi and State of Missouri, have invented certain new and useful Improvements in Drive Well-Points, of which the following is a specification.

My invention relates to drive well-points and has particular reference to a device of this character provided with novel means for preventing the walls of the openings formed through the body portion thereof from corroding, whereby such openings and wire gauze spanning the same are effectually prevented from being clogged or stopped up.

An important object of this invention is to provide means of the above mentioned character, which are simple in construction, cheap to manufacture and durable.

Other objects and advantages of this invention will be apparent during the course of the following description.

In the accompanying drawings forming a part of this specification and in which like numerals are employed to designate like parts throughout the same, Figure 1 is a side view of the well-point, Fig. 2 is a central longitudinal sectional view through the same, Fig. 3 is an enlarged detail sectional view through the elements arranged adjacent each of the radial openings of the body portion of the device, Fig. 4 is a fragmentary side view of a portion of the well-point, showing a different form of means for protecting the walls of the openings formed therethrough, Fig. 5 is a detail section through one of these protecting means, and, Fig. 6 is a plan view of a stamped blank from which the protecting means is formed.

My improved well-point comprises a tubular body portion 4, which is preferably formed of iron, having one end screw-threaded, as shown at 5, for connection with an extension pipe. Extending into and closing the opposite end of the tubular body portion 4 is a shank 6, carried by a pointed head 7, which extends radially for a considerable distance beyond the periphery of the tubular body portion 4, as shown. A clamping screw 8 or the like is employed to securely hold the shank 6 in place within the tubular body portion 4.

The tubular body portion 4 is provided with a suitable number of relatively large openings 9, extending radially, as shown. In constructing well-points, it has heretofore been customary to have the openings 9 covered or spanned by a section of wire gauze. It has been found in employing a tubular body portion, which is ordinarily constructed of iron, (as it would be entirely too expensive to make the same of copper, brass, or some other non-corrosive metal), that the openings 9 and the wire gauze become clogged, due to the accumulation of iron-rust.

To overcome the above referred to disadvantage, I provide a tubular protecting casing or lining 10, which is mounted within each of the openings 9. This casing or lining is preferably formed of copper, brass, or any other relatively non-corrosive metal, which is not too expensive. The tubular casing or lining 10 may preferably be provided at its inner end with an annular flange 11, to engage the inner surface or wall of the tubular body portion 4. An outer annular flange 12 is formed by bending down the outer end of the tubular casing or lining 10. Spanning the outer end of the protecting casing or lining 10 and engaging the annular flange 12, is a preferably circular section of copper wire gauze 13, as shown. This copper wire gauze may be soldered or otherwise securely attached to the outer annular flange 12. Disposed outwardly of the section of copper wire gauze 13, is a perforated shield 14, which is preferably formed of copper, brass or any other relatively non-corrosive metal. This perforated shield is rigidly connected with the outer annular flange 12 by being soldered thereto or by any other suitable means. It is obvious that my construction is very economical in the use of copper or the like, whereby a saving is had in the manufacture of the device.

In Figs. 1, 2, 4, 5 and 6 inclusive, I have shown a different form of protecting means. The tubular body portion 4 is provided with a suitable number of radially extending openings 15, which are tapered and increase in diameter outwardly. The function of having the openings 15 tapered and increasing in diameter outwardly is to provide means for facilitating the insertion of a tube or tubular body portion 17, therein, which will be hereinafter referred to. As more clearly shown in Fig. 6, the numeral 16 designates a blank from which the protecting means is formed. When this blank is stamped out, a central tubular body portion 17 is formed or bent into the desired shape, the same being tapered and increasing in diameter outwardly, to properly fit within the opening 15. The tubular body portion 17 is provided at its outer end with a flange 18, carrying at its ends and sides separate tapered sections 19, which are adapted to be bent inwardly to over-lap the tubular body portion 17, as more clearly shown in Figs. 4 and 5. The sections 19 have their ends provided with curved recesses 20, whereby when these sections are bent inwardly, an opening 21 is obtained, as more clearly shown in Fig. 4. A section of wire gauze 22 is disposed upon the flange 18 before the sections 19 are bent inwardly, as above stated, whereby the sections 19 in their inwardly bent positions serve as a perforated shield to hold the wire gauze in place. The protecting means including the tubular body portion 17 may be soldered or otherwise rigidly connected with the tubular body portion 4, so that it will be properly held in place thereon. The blank 16 is preferably formed of copper or any other relatively non-corrosive metal which is not too expensive. The wire gauze 22 is also preferably formed of copper. There is an important function in providing the independent tapered or triangular sections 19, to wit, when they are folded down they will properly fit to form an outer wall or shield, provided at its center with a suitably large opening, thus protecting the gauze 22 except at the opening 21. By having these sections 19 separate, or the outer wall split, said sections may be readily bent outwardly, to allow of the removal of the wire gauze and the insertion of a new section of wire gauze, subsequently to which the triangular sections may again be bent down upon the gauze.

It is to be understood that the form of my invention herewith shown and described is to be taken as a preferred example of the same, and that certain changes in the shape, size and arrangement of parts may be resorted to without departing from the spirit of the invention or the scope of the subjoined claim.

Having thus fully described my invention, I claim:—

A well point of the character described, comprising a tubular body portion provided with laterally extending discharge openings which are tapered and increased in diameter outwardly for facilitating the insertion of a protecting tube therein, an approximately rectangular section of relatively non-corrosive sheet metal provided with an inwardly extending tapered tube which increases in diameter outwardly and is adapted for insertion within the tapered laterally extending opening of the tubular body portion to cover the wall thereof, the approximately rectangular section of relatively non-corrosive sheet metal being provided upon its opposite edges with independent substantially triangular extensions bent down upon the same and having the apexes thereof cut away to form curved recesses brought into registration for forming a central opening, the substantially triangular extensions forming an outer protecting wall, a section of relatively non-corrosive wire gauze held between the section of sheet metal and the triangular extensions and protected by the triangular extensions, whereby said triangular extensions by being separate are capable of being readily bent outwardly to permit of the removal of the section of wire gauze when desired, and means for attaching the section of sheet metal to the tubular body portion.

In testimony whereof I affix my signature in presence of two witnesses.

OLAVE W. ANDREWS.

Witnesses:
O. W. JOSLYN,
EDWIN J. DEAL.